United States Patent
Langrel et al.

(10) Patent No.: US 8,081,353 B2
(45) Date of Patent: Dec. 20, 2011

(54) ENHANCED ILLUMINATED SCANNING UNIT REFERENCE MARKER

(75) Inventors: Charles B. Langrel, Lexington, KY (US); Chengwu Cui, Lexington, KY (US); Allen W. Waugerman, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1039 days.

(21) Appl. No.: 11/954,714

(22) Filed: Dec. 12, 2007

(65) Prior Publication Data

US 2009/0153919 A1 Jun. 18, 2009

(51) Int. Cl.
*H04N 1/04* (2006.01)

(52) U.S. Cl. ........ 358/474; 358/480; 358/496; 358/501; 399/110

(58) Field of Classification Search .......... 358/480, 358/474, 497, 496, 498, 475, 509, 486; 399/110
See application file for complete search history.

(56) References Cited

U.S. PATENT DOCUMENTS

| | | | |
|---|---|---|---|
| 5,084,760 A * | 1/1992 | Hashimoto et al. | 358/300 |
| 6,222,545 B1 * | 4/2001 | Suzuki et al. | 345/418 |
| 6,773,394 B2 * | 8/2004 | Taniguchi et al. | 600/117 |
| 7,221,487 B2 * | 5/2007 | Sesek et al. | 358/488 |
| 7,471,394 B2 * | 12/2008 | Padmanabhan et al. | 356/365 |
| 7,880,938 B2 * | 2/2011 | Shiraishi | 358/474 |
| 2003/0038227 A1 * | 2/2003 | Sesek et al. | 250/208.1 |
| 2003/0095294 A1 * | 5/2003 | Shih et al. | 358/497 |
| 2003/0223059 A1 * | 12/2003 | Li | 356/317 |
| 2004/0085443 A1 * | 5/2004 | Kallioniemi et al. | 348/135 |
| 2005/0148854 A1 * | 7/2005 | Ito et al. | 600/407 |
| 2006/0285182 A1 * | 12/2006 | Suzuki et al. | 358/532 |
| 2007/0035755 A1 * | 2/2007 | Maki et al. | 358/1.9 |

* cited by examiner

*Primary Examiner* — Negussie Worku

(57) ABSTRACT

A method for providing a visible reference marker on a scanning unit for orienting an item to be scanned or copied includes the steps of emitting a light from a light source, guiding the light to a scanning unit having a contact glass scanning surface, and redirecting the light to define an illuminated reference marker substantially adjacent to the contact glass. A reference marker assembly for accomplishing that method is provided, including a light source, a waveguide for guiding light emitted from the light source to a scanning unit having a contact glass, and a redirector for redirecting the light to define an illuminated reference marker adjacent to the contact glass, for orienting an item to be copied or scanned. The light source may be a light emitting diode, and the redirector may be a light diffuser for redirecting the collected light to define an illuminated reference marker adjacent to the contact glass.

21 Claims, 3 Drawing Sheets

ENHANCED ILLUMINATED SCANNING UNIT REFERENCE MARKER

FIELD OF THE INVENTION

Generally, the present invention relates to electrophotographic devices, such as scanners, printers, or copy machines. Particularly, it relates to an improved reference marker for a scanning unit, such as for a flatbed scanner or copy machine, for identifying proper positioning on the scanning unit of an item to be scanned or copied. In one aspect, a method is provided for defining an illuminated reference marker on a scan unit. An illuminated reference marker assembly for a scan unit is provided also.

BACKGROUND OF THE INVENTION

As is known in the art, various electrophotographic devices include a scanning unit for imaging an item to be scanned prior to transferring that image to, e.g., paper, transparencies, photographic paper, or a digital image storage means. Typically a scanning unit, such as a flatbed scanning unit of a well-known type used in electrophotographic devices such as scanners, printers, or copy machines, includes a contact glass on which an item to be scanned or copied is placed.

A conventional scanning unit associated with an electrophotographic device, unless the device is intended to be portable, is fixed in place. That is, the scanning unit repeatedly scans a defined, fixed area on or in the electrophotographic device, and the item to be scanned must be correctly positioned over this defined area. For this reason, it is important to properly place an item to be scanned or copied on the scanning unit to ensure that the full surface of the item is imaged. To aid the user in properly positioning an item such as a sheet of paper to be scanned, a reference marker, often in the shape of an arrow, is usually provided to indicate the desired positioning of at least one corner of the item.

Such reference markers are typically placed adjacent the scanning unit contact glass, e.g., by molding or embossing the desired design into the material framing the contact glass, by imposing an adhesive decal, or by use of a paint or dye. Such methods of (and structures for) providing a reference marker are suitable for their intended purpose, but suffer from a number of disadvantages. A reference marker molded or embossed into the scanning unit may be difficult for the user to see. Further, reference markers defined by molding, embossing, painting, or by use of a decal may deteriorate over time. That is, the reference marker may be partially or wholly worn or rubbed off, reducing user convenience.

SUMMARY OF THE INVENTION

The above-mentioned and other problems become solved by applying the principles and teachings associated with the presently described method and device for providing a visible, illuminated reference marker on a scanning unit. In its most basic sense, the present method comprises emitting a light from a light source, guiding that light to a scanning unit having a contact glass scanning surface, and redirecting that light to define an illuminated reference marker substantially adjacent to the contact glass. A waveguide is provided for guiding the light to the scanning unit, comprising a collector for collecting at least a portion of the emitted light and a guide member for guiding and focusing the light.

Still further, a reference marker assembly for a scanning unit for a copy machine or scanner is provided, comprising a light source, a waveguide, and a redirector for redirecting light to define an illuminated reference marker. The light source may be a light emitting diode or other suitable focused light source. The waveguide may comprise a collector for collecting at least a portion of the light emitted from the light source, and a guide member extending from that collector for guiding and further focusing the collected light to a desired point adjacent to the scanning unit. A redirector may be provided for redirecting the collected light to define an illuminated reference marker at a desired position adjacent to the scanning unit contact glass. The redirector typically includes at least one light-diffusing surface for scattering light passing therethrough.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention maybe practiced. These embodiments are described in sufficient detail to enable those skilled in the art to practice the invention and like numerals represent like details in the various figures. Also, it is to be understood that other embodiments may be utilized and that process, mechanical, electrical, software, and/or other changes may be made without departing from the scope of the present invention. In accordance with the present invention, a method is described for providing a visible, illuminated reference marker on a scanning unit is provided, for orienting an item to be scanned or copied. An assembly for providing that visible reference marker is described also.

Figure 1:
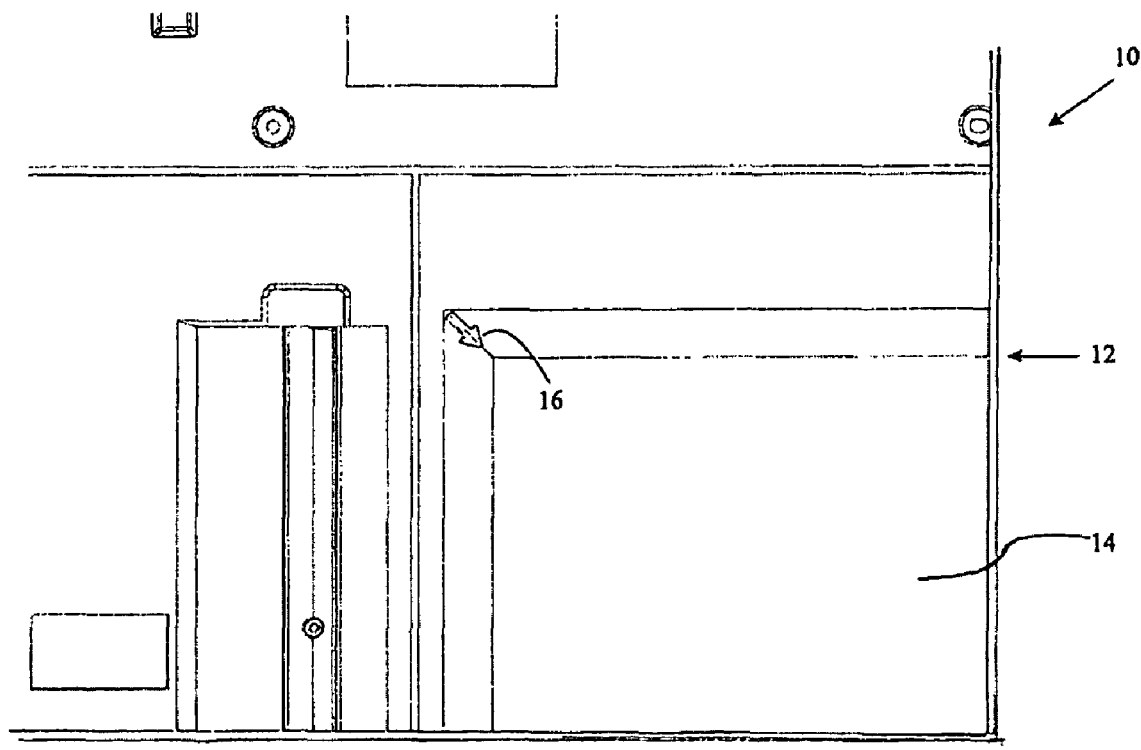
FIG. 1 depicts a representative electrophotographic device.

With reference to FIG. 1, an electrophotographic device 10 as set forth herein representatively includes mono or color laser printers, scanners, or copy machines. Such electrophotographic devices 10 generally include a scanning unit 12 having a contact glass 14, which is where the user places the item to be scanned, such as a sheet of paper or a book page. To ensure proper orientation of the item to be scanned, conventionally a reference marker 16 is provided at a predetermined position adjacent the scanning unit 12 contact glass 14. The user then need only align a corner of the item to be scanned in the corresponding corner of contact glass 14 as indicated by reference marker 16, and the item will be properly aligned for scanning. As noted above, such reference markers 16 are typically placed adjacent to a contact glass 14 by any of a number of methods, such as embossing or molding the desired shape into the material of the portion of the scanning unit 12 framing the contact glass 14, by painting the reference marker 16 thereon, by adhering a decal to the desired position as reference marker 16, or the like.

Figure 2:
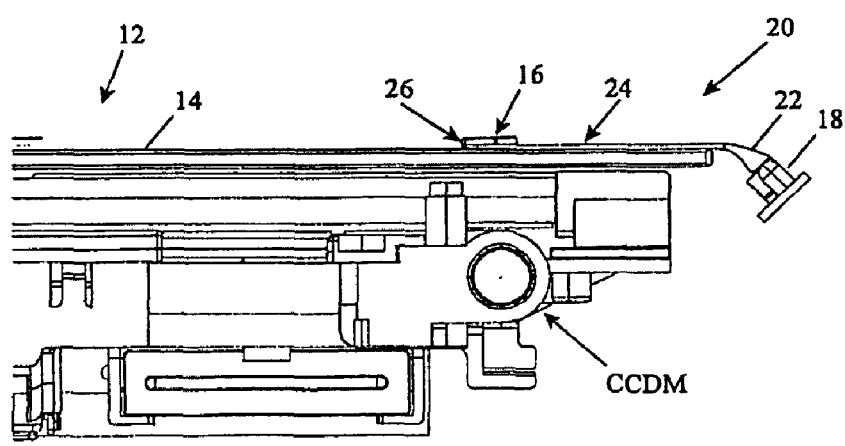
FIG. 2 shows the electrophotographic device of FIG. 1 in side view, with a light source, waveguide, and light redirector positioned thereon.

To address this disadvantage of conventional methods and devices for providing a reference marker 16 on a scanning unit 12, a method is set forth for providing a visible, illuminated reference marker 16 on a scanning unit 12 for orienting an item to be scanned or copied. With reference to FIG. 2, the method comprises emitting a light from a light source 18, guiding that light to a scanning unit 12 having a contact glass 14 scanning surface, and redirecting the light to define an illuminated reference marker 16 substantially adjacent to the contact glass 14. The method includes providing a waveguide 20 for guiding the light to the scanning unit.

Figure 3:
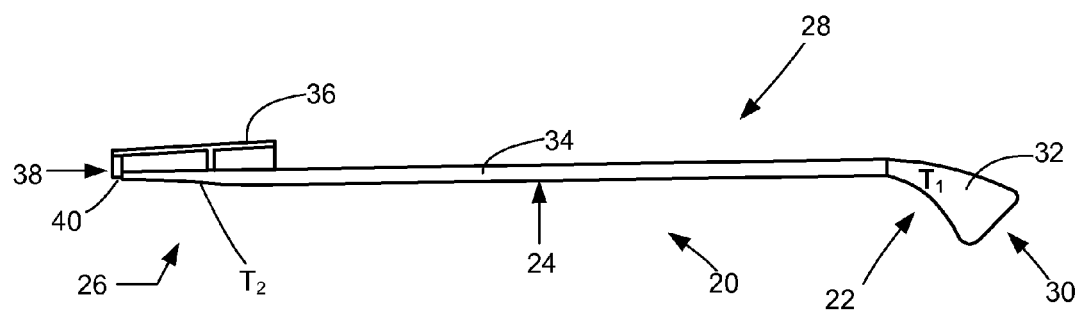
FIG. 3 shows the present waveguide in side view.

With reference to FIGS. 2 and 3, the waveguide 20 provided in the method may comprise a collector 22 for collecting at least a portion of the light emitted from the light source 18, and a guide member 24 extending from the collector 22 for guiding and further focusing the collected light. The light exiting the guide member 24 may be passed through a redirector 26 to scatter the light and define the illuminated reference marker.

Still further, as best seen in FIGS. 2 and 3, a reference marker assembly 28 for an electrophotographic device is provided, comprising a light source 18, a waveguide 20 for guiding light emitted from the light source 18 to a scanning unit 12 having a contact glass 14, and a redirector 26 for redirecting the light to define an illuminated reference marker 16 adjacent to the contact glass 14, for orienting an item to be copied or scanned. Any suitable light source 18 may be utilized, including without limitation a light emitting diode, an incandescent lamp, a laser, a halogen lamp, a gas discharge lamp, and a high intensity discharge lamp. The skilled artisan will readily appreciate that light source 18 may be adapted for constant emission of light, or may alternatively be adapted for interrupted or flashing light emission, may provide light of a constant brightness or differing degrees of brightness, and the like. In one embodiment, the light source 18 is a light emitting diode, and is positioned approximately two inches from the redirector 26.

Figure 4:
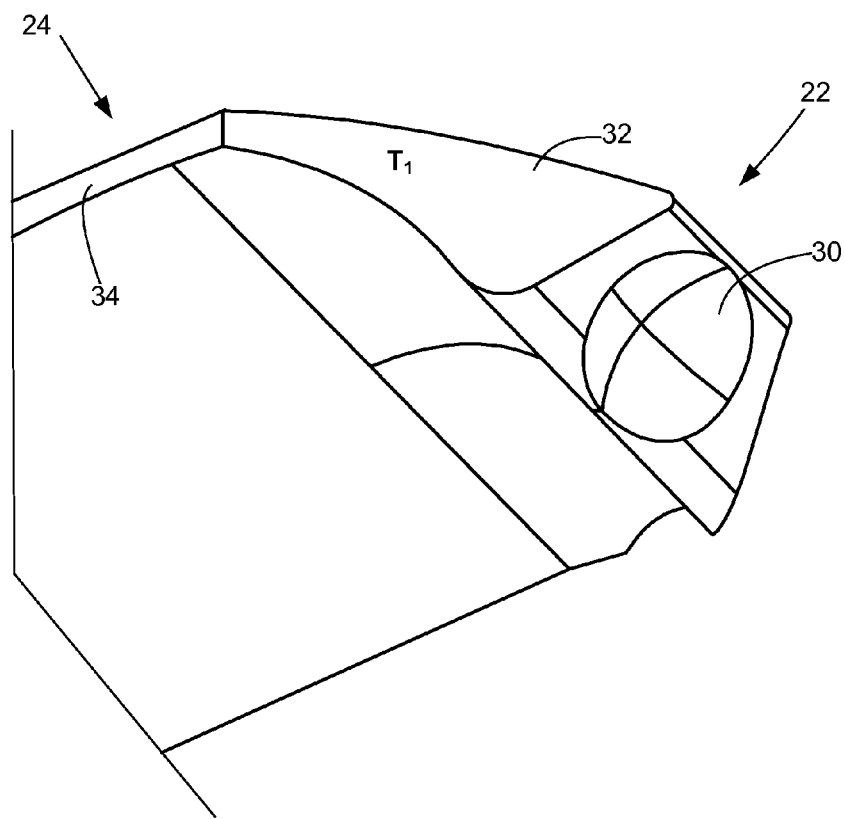
FIG. 4 shows a light collector of the present waveguide in isolation.

Any of a number of devices may be selected for use in waveguide 20, such as without limitation a light pipe or one or more optical fibers. Still further, a mirrored reflecting system is contemplated, that is, a plurality of mirrors positioned in series for reflecting and guiding light from the light source 18 to the redirector 26. As one example (embodiment not shown), a conic shaped guide having a polygonal cross-section, with mirrored or otherwise light-reflective interior surfaces, could be utilized. Even more, a lens system (embodiment not shown) is contemplated for guiding light, such as a rod lens of gradient refraction surface. Indeed, a variety of suitable optical means could be utilized, with the proviso that the selected structure transports light emitted from the light source 18 to the redirector 26 in the desired manner. The waveguide 20 may include a collector 22 for collecting at least a portion of the light emitted from the light source, and a guide member 24 extending from the collector 22 for guiding and further focusing the collected light. The collector 22 (see FIG. 4) may include an enlarged light collecting aperture 30 and at least one side wall 32 defining a taper $T_1$ for guiding the light to the guide member 24.

Figure 5:
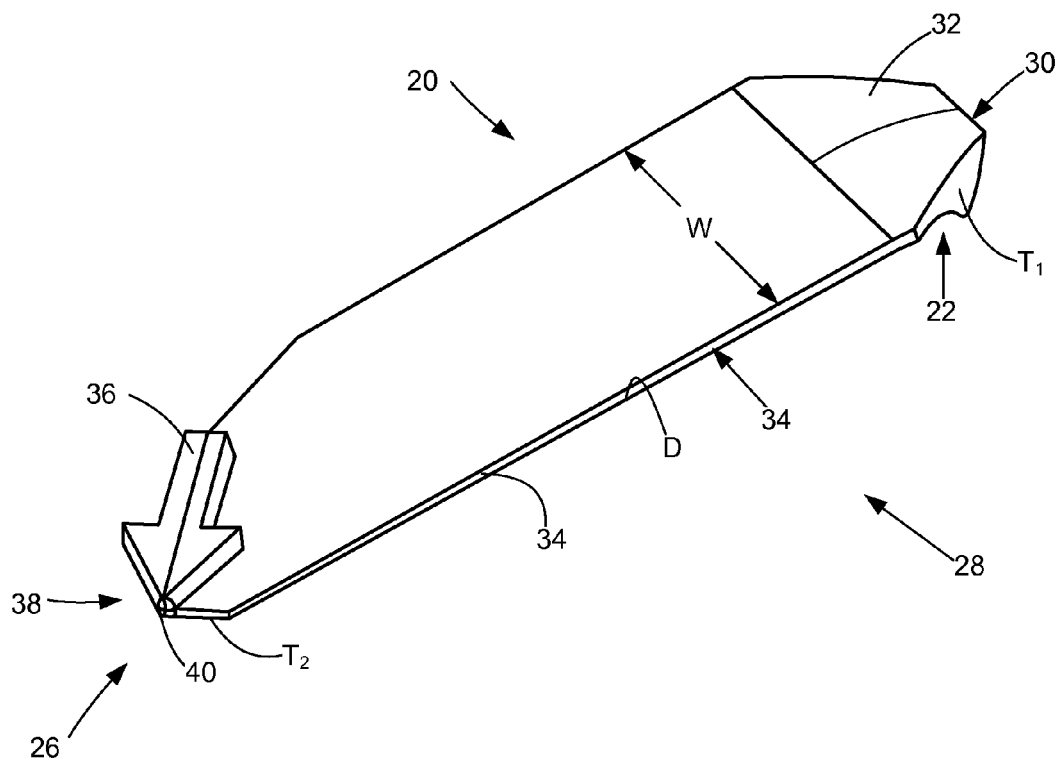
FIG. 5 shows a top view of the waveguide of FIG. 3.

Typically (see FIG. 3), the guide member 24 includes at least one sidewall 34 defining a taper $T_2$ for guiding and further focusing the collected light passed therethrough to the redirector 26. In one embodiment, best seen in FIG. 5, guide member 24 defines an elongated rectangular cross-section, having a width W that is greater than its depth D. This provides a particular advantage when incorporated into an electrophotographic device such as that depicted in FIG. 2. Specifically, manufacturers of electrophotographic devices typically desire to minimize the physical distance between a charge-coupled device module of a type well known in this art (indicated generally with the notation CCDM) and the contact glass 14. By reducing that distance, optimal image quality is achieved and a better scan is possible. Further, a conventional charge-coupled device module requires a relatively large clear space under an item to be scanned, to allow the desired path of travel for the charge-coupled device module. The need to provide this relatively large clear space for a path of travel of the charge-coupled device module CCDM proscribes, for example, simply positioning a light source 18 directly underneath the desired position of reference marker 16.

The depicted embodiment of guide member 24 allows positioning the light source 18 at a suitable distance from a position adjacent the contact glass 14 at which the reference marker 16 is to be defined. Indeed, the depth D of the guide member 24 may be adapted specifically to fit within the allowable space for a particular electrophotographic device, without changing the distance between the charge-coupled device module CCDM and the contact glass 14. Of course, it will be appreciated that the available space between the charge-coupled device module and the contact glass 14 will vary between different electrophotographic devices. By guiding light emitted from light source 18 to the desired position adjacent contact glass 14 as described above using guide member 24, an illuminated reference marker 16 may be provided without altering the physical distance between the charge-coupled device module CCDM and the contact glass 14.

The redirector 26 may be fabricated of any suitable material which permits at least a portion of the collected light to pass therethrough. As non-limiting examples, a suitable clear plastic, clear polycarbonate, light-diffused polycarbonate, or the like may be used. A housing 36, for assisting in defining the desired shape of reference marker 16, may also be provided. Of course, it will be appreciated that redirector 26 may be fabricated of any suitable material capable of redirecting light from a first path of travel to a second path of travel, such as any reflective or refractive material.

Figure 6:
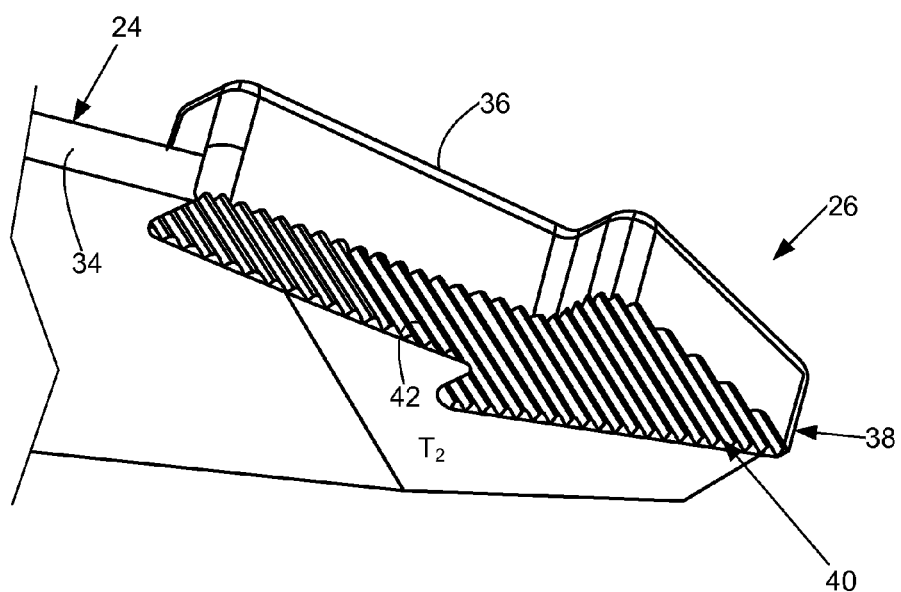
FIG. 6 shows a light redirector in isolation.

In one embodiment, shown in isolation in FIG. 6, the redirector 26 serves as a light diffuser 38, and includes at least one light-diffusing surface 40 for scattering light passing therethrough. In that embodiment, as set forth above at least a portion of light emitted from a light source 18 is collected by collector 22 via light collecting aperture 30, passes through guide member 24, is further focused by taper $T_2$, and strikes diffuser 38. At least a portion of the collected light passes through diffuser 38, and is scattered by light diffusing surface 40 to define the illuminated reference marker 16.

Light diffusing surface 40 may be any interrupted surface capable of scattering light passing therethrough, to improve visibility of the illuminated reference marker 16. In the embodiment depicted in FIG. 6, a series of substantially parallel ridges 42 are provided to scatter light passing therethrough. Of course, any number of suitable configurations (not shown for convenience) for providing light diffusing surface 40 are possible, including without limitation a crosshatched surface, one or more dimples, one or more frusto-conical configurations, and the like. Light traveling in the light diffusing surface 40 propagates according to the law of total internal reflection. When light reaches the light diffusing surface 40 of light redirector 26, it is converged and redirected to the reference marker 16 surface with such angles that it will pass through instead of creating total internal reflection and can be seen when viewed by the user as brilliant light patterns. Indeed, the viewable light pattern appears more brilliant using this structure than would be true by simply transmitting the same amount of light, without the redirector 26. Other patterns can be created based on the same principle. The boundary of the light diffusing surface 40 aids in defining the overall configuration of the reference marker 16, which can be an arrow as depicted herein.

Accordingly, a method and an assembly for providing an illuminated reference marker 16 are described herein. Advantageously, the method and assembly described provide such an illuminated reference marker 16 which is well adapted to inclusion in any number of electrophotographic devices. In particular, conventional electrophotographic devices provide only a limited physical space for such devices, due to the desire of the manufacturer to locate the charge-coupled device module as close to the contact glass 14 as possible to maximize scan quality. The present reference marker assembly 28 solves this problem by providing a structure which integrates well into such an electrophotographic device, without exceeding the physical space available.

One of ordinary skill in the art will recognize that additional embodiments of the invention are also possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. A method for providing a visible reference marker on a scanning unit for orienting an item to be scanned or copied, comprising:
    emitting a light from a light source;
    guiding the light to the scanning unit having a contact glass scanning surface; and
    redirecting the light to illuminate the visible reference marker fixably mounted on the scanning unit so as to be in a fixed position substantially adjacent to the contact glass.

2. The method of claim 1, including providing a waveguide for guiding the light to the scanning unit.

3. The method of claim 2, including:
    collecting at least a portion of the light emitted from the light source; and
    guiding and further focusing the collected light to the scanning unit.

4. The method of claim 3, including passing the collected light exiting the guide member through a diffuser to scatter the light and define the illuminated reference marker.

5. An imaging device, comprising:
    a scanning unit including contact glass for receiving one or more sheets of media to be scanned; and
    a reference marker assembly, comprising:
        a reference marker disposed on the scanning unit adjacent the contact glass in a fixed position relative the contact glass;
        a light source;
        a waveguide for guiding light emitted from the light source towards the reference marker; and
        a redirector for redirecting the guided light to illuminate the reference marker adjacent to the contact glass, for orienting an item to be copied or scanned.

6. The imaging device of claim 5, wherein the light source is selected from the group of light sources consisting of a light emitting diode, an incandescent lamp, a laser, a halogen lamp, a gas discharge lamp, and a high intensity discharge lamp.

7. The imaging device of claim 6, wherein the light source is positioned about two inches from the redirector.

8. The imaging device of claim 5, wherein the waveguide comprises:
    a collector for collecting at least a portion of the light emitted from the light source; and
    a guide member extending from the collector for guiding and further focusing the collected light.

9. The imaging device of claim 8, wherein the waveguide is selected from one of a light pipe, at least one optical fiber, a mirrored reflecting system, and a lens system.

10. The imaging device of claim 9, wherein the collector comprises an enlarged light collecting aperture and at least one side wall defining a taper for guiding the light to the guide member.

11. The imaging device of claim 9, wherein the guide member includes at least one sidewall defining a taper for guiding and further focusing the collected light passed therethrough to the redirector.

12. The imaging device of claim 9, wherein the guide member has an elongated rectangular cross-section having a width greater than a depth.

13. The imaging device of claim 5, wherein the redirector permits at least a portion of the light to pass therethrough.

14. The imaging device of claim 13, wherein the redirector includes at least one light-diffusing surface for scattering light passing therethrough.

15. The imaging device of claim 5, wherein the redirector includes a series of substantially parallel ridges for scattering light passing through the redirector.

16. A reference marker assembly for a scanning unit of an electrophotographic device, comprising:
    a light emitting diode light source;
    a waveguide for collecting at least a portion of the light emitted from the light source and guiding the collected light to a scanning unit having a contact glass, the waveguide comprising a tapered light collector and a guide member extending from the light collector;
    a reference marker mounted in a fixed position on the scanning unit and positioned substantially adjacent to the contact glass so as to be in a fixed relation thereto; and
    a diffuser for redirecting the collected light to illuminate the reference marker adjacent to the contact glass, for orienting an item to be copied or scanned.

17. The reference marker assembly of claim 16, wherein the diffuser permits at least a portion of the collected light to pass therethrough to define the illuminated reference marker.

18. The reference marker assembly of claim 17, wherein the diffuser includes at least one light-diffusing surface for scattering light passing therethrough.

19. The reference marker assembly of claim 16, wherein the guide member includes at least one sidewall defining a taper for guiding and further focusing the collected light passed therethrough to the diffuser.

20. The reference marker assembly of claim 16, wherein the light emitting diode is positioned about two inches from the diffuser.

21. The reference marker assembly of claim 16, wherein the diffuser includes a series of substantially parallel ridges for scattering light passing through the diffuser.

* * * * *